United States Patent
Laflamme

[11] Patent Number: 5,921,847
[45] Date of Patent: Jul. 13, 1999

[54] GRINDING FIXTURE AND METHOD OF REMANUFACTURING TOOL INSERTS

[76] Inventor: Robert P. Laflamme, R.R. 3, Box 90C, Laconia, N.H. 03246

[21] Appl. No.: 08/935,451

[22] Filed: Sep. 24, 1997

Related U.S. Application Data

[51] Int. Cl.$^6$ .............................. B24B 1/00; B24B 41/06; B24B 19/00
[52] U.S. Cl. ......................... 451/48; 451/216; 451/232; 451/279; 451/374; 451/404; 451/405
[58] Field of Search ..................................... 451/367, 374, 451/365, 205, 204, 28, 48, 216, 232, 279, 404, 405

[56] References Cited

U.S. PATENT DOCUMENTS

| | | | |
|---|---|---|---|
| 1,393,634 | 10/1921 | Moller et al. | 451/205 |
| 3,881,888 | 5/1975 | Schwab | 451/367 |
| 4,463,524 | 8/1984 | Schott et al. | 451/281 |
| 5,421,679 | 6/1995 | Pantzar et al. | 407/114 |

*Primary Examiner*—Timothy V. Eley
*Assistant Examiner*—Philip J. Hoffmann
*Attorney, Agent, or Firm*—Michael J. Persson, Esq; William B. Ritchie

[57] ABSTRACT

A swing grinding fixture and process for using the same is disclosed that enables a conventional surface grinder to remanufacture a machine tool cutting insert by grinding a predetermined shape into the insert. A quick clamping insert holder coupled to a slide secures the tool insert in the fixture. A precision spindle cartridge is mounted in a rigid fixture body and coupled to the slide to provide the swing motion required to generate the radius to be ground. The rigid fixture body includes a pair of micrometer adjustable stops which limit the arc through which the slide may be swung and control the flank shape ground into the insert. In an alternative embodiment, a sine plate is attached to the fixture body and is used to incline the fixture to a predetermined insert rake angle. In operation, the grinding fixture is securely mounted to the table of a surface grinder and a cutting tool insert is secured in the insert holder. The grinding table is manipulated to align the grinding wheel with the axis of rotation of the spindle and the position of the insert is adjusted to manipulate the amount of material to be ground from the insert. The slide is then swung clockwise to contact one micrometer adjustable stop and counterclockwise to contact a second micrometer stop, whereby a predetermined radius, substantially equal to the radius of rotation, is ground into the edge of the tool insert.

18 Claims, 4 Drawing Sheets

GRINDING FIXTURE AND METHOD OF REMANUFACTURING TOOL INSERTS

FIELD OF THE INVENTION

The invention relates to the field of tool remanufacture and, in particular, to fixtures for holding and manipulating tool inserts during remanufacturing and methods for remanufacturing the same.

BACKGROUND OF THE INVENTION

The use of cutting tools having replaceable cutting inserts began as long ago as 1917, when Fred P. Lovejoy invented the use of replaceable blades in order to obtain the economic advantages of having to replace only the dull portion of the tool, not the entire tool itself.

The next major improvement in this process was the invention of the tungsten titanium carbide insert by Philip M. McKenna in 1938, especially for use in milling machines. A typical milling machine is an apparatus that features a rotating mill head having a number of indexable cutting inserts, where the rotating head is passed over the workpiece to remove material from the workpiece.

Since the time of the invention of the carbide cutting insert, tremendous effort has been made to understand the myriad factors affecting the performance of cutting inserts. These factors include insert geometry, insert construction, temperature, cutting forces, workpiece material characteristics, and chip control. In fact, Kennametal, Inc., founded by inventor Philip McKenna, lists thousands of insert geometry/size/composition/coating combinations in order to meet the requirements of differing applications. Despite the overwhelming number of inserts that are available, standard inserts are still "standardized".

Inserts having various basic geometric shapes can be selected, with the most common being the square, triangle, rhomboid, and hexagon. Indexable inserts have a plurality of cutting edges that increase the working life of the insert. Once a particular cutting edge has become dull, the insert is indexed in its holder to expose a new cutting edge. Once all cutting edges have dulled, the insert is believed to be useless and is thrown away.

Sophisticated technology has been developed concerning the selection of materials and geometries of cutting inserts resulting in vast improvements in durability and cutting efficiency, with attendant cost increases. Despite the advances in insert technology and increased costs of cutting inserts, these inserts are still defined and treated as "throwaway", even in the USA Standard Indexable Inserts for Cutting Tools (894.25-1969).

Indexable inserts generally are manufactured by pressing powdered metal into various shapes and then sintering in a furnace to establish the hard quality of the material. In some applications, the need for inserts having a high dimensional accuracy has led to attempts to grind the edges of new inserts.

U.S. Pat. No. 4,463,524, issued to Schott et al. on Aug. 7, 1984, discloses a dedicated machine for finish grinding indexable tool inserts that includes a pivoting grinding wheel that rotates in a horizontal plane and a tool insert holder that rotates the insert during grinding such that all sides and edges of the insert are ground. However, the machine disclosed in the Schott et al. patent is not adapted for the remanufacture of tool inserts as all sides of the insert are ground which results in a ground new insert of the correct size. When applied to the remanufacture of a previously used insert, however, the result is an insert having a smaller overall size than that of the original. Since a remanufactured insert reground by the disclosed machine is smaller than original, the inscribed circle (defined as the largest internal circle that can be drawn such that all sides of the insert are tangent to that circle) is also reduced and the remanufactured insert does not fit accurately within the tool holder. This drawback can be countered by the use of shims, complicating the installation process. In addition to its inapplicability to the remanufacturing of dulled inserts, the machine of Schott et al. is a dedicated machine which may only be used to grind inserts and thus would not be a cost effective solution for most machine shops and other small scale users of tool inserts.

Similarly, U.S. Pat. No. 5,421,679, issued to Pantzar et al. on Jun. 6, 1995, discloses a grinding operation that is intended to be used only along an area against a locating surface of a machine tool. Like those of Schott et al., the inserts disclosed by Pantzar et al. require a very high degree of dimensional accuracy that is met by after-grinding the surface(s) adjacent to the cutting edge after the insert is sintered. However, it is taught that this grinding (called contour grinding) causes adverse modifications in the microgeometry of the insert. Thus, Pantzar et al. discloses what has been a commonly held truism in the art for more than 45 years: inserts cannot be sharpened once dull without damaging the geometry of the insert. This perceived damage is one reason for the mistaken belief that inserts must be thrown away once dull.

The belief that dull inserts must be thrown away has been reinforced by failed efforts to regrind used inserts to gain additional useful life before the insert must be discarded. The most ambitious of the regrinding attempts to reclaim dulled inserts, frequently referred to as "downsizing", is provided by North American Carbide, Inc. of Broken Arrow, Okla. In this process, the "dulled"/used insert is reground using specially adapted grinding machinery so that an insert that is virtually identical to the original, only slightly smaller, is obtained. Unfortunately, the success of this process has been rather limited as the reduction in overall size of the insert results in the same problems as would be encountered by using the machine of Schott et al., i.e. reduction of the size of the inscribed circle resulting in difficulty in accurately clamping the insert within the tool holder. Many companies initially embraced this concept, recognizing the significant financial advantage of being able to increase the life span of an insert. However, the difficulties encountered with clamping the inserts to fit accurately within the tool holder once it had been refurbished quickly diminished the enthusiasm for the approach. Consequently, the belief that cutting inserts are only capable of a one-time use and then must be thrown away continues to prevail after all these years.

An apparatus and process for grinding a dulled tool insert that may be used with a standard grinding machine, that will provide sharpened edges having cutting performance equal to, or exceeding, a new insert, and that will provide an insert which can be held in a tool holder without the use of shims or special holders is not known in the prior art.

SUMMARY OF THE INVENTION

The invention is a swing grinding fixture and process for using the same that enables a conventional surface grinder to remanufacture a machine tool cutting insert by grinding a predetermined radius and flank shape into the insert.

In the preferred embodiment of the apparatus of the present invention, a quick clamping insert holder, adapted to accommodate standard tool insert shapes, secures the tool insert in the fixture. The insert holder is coupled to a slide having a micrometer dial screw which permits adjustment of the amount of material to be ground from the cutting tool insert by changing the position of the tool insert relative to the center of rotation of a precision spindle cartridge. The precision spindle cartridge is mounted into the fixure body and coupled to the slide to provide the swing motion required to generate the radius to be ground. The fixture body includes two gage balls, allowing the centerline of the grinding wheel to be aligned with the center of rotation of the spindle, and micrometer adjustable stops that limit the arc through which the tool insert swings during sharpening to provide accurate grind run-out on the insert flanks and to prevent changes to the basic insert size. A sine plate, bolted to the fixture body and coupled to the grinding table by a magnetic chuck, is used to incline the fixture to the predetermined insert rake angle.

In an alternative embodiment of the apparatus, the micrometer dial screw and gage balls are eliminated and the proper position of the grinding wheel and tool insert are determined and controlled by a human operator.

In another embodiment of the apparatus, the sine plate is eliminated and the fixture body is secured directly to the grinding table.

In another embodiment of the apparatus, a grinding wheel having a grinding surface of predetermined shape is utilized in order to grind a predetermined flank shape into the tool insert.

All embodiments of the apparatus of the present invention use easily replaceable modular components, many of which are readily available standard products, and therefore are relatively inexpensive to build and maintain. In addition, the grinding fixture of the present invention may be quickly and easily mounted on most standard surface grinders, reducing set-up costs and the capital costs associated with the use of dedicated equipment.

In the preferred process of the present invention, a grinding fixture is securely mounted to the table of a surface grinder and a cutting tool insert is manually inserted and secured in the insert holder. The grinding table is manipulated to align the grinding wheel with gage balls on the fixture body to insure that the centerline of the grinding wheel is aligned with the center of rotation of the spindle. A table stop is then set to assure repeat alignment. The grinding table is then manipulated to properly position the grinding surface of the grinding wheel relative to the center of rotation of the insert to be remanufactured corresponding to a predetermined radius of rotation. The position of the insert is adjusted by the micrometer dial screw to manipulate the amount of material to be ground from the insert. The grinding wheel is then set into motion and the slide is swung clockwise to contact one micrometer adjustable stop and counterclockwise to contact a second micrometer stop, whereby a predetermined radius, substantially equal to the radius of rotation, is ground into the edge of the tool insert. Subsequent dulled cutting tool inserts may then be sharpened by simply moving the table to a second stop away from the grinding wheel, removing the sharpened insert from the insert holder, securing another dulled insert into the holder, moving the table back under the grinding wheel and against the first stop, and rotating the slide clockwise and counterclockwise as in the preferred process.

In an alternative process, the steps outlined above are repeated, but a sine plate is angled relative to the grinding surface of the grinding wheel such that a radius and a flank shape with a positive rake angle are ground into the insert.

All embodiments of the process of the present invention result in sharpened tool inserts that cut material more effectively than new tool inserts while providing sharpened inserts having the same basic size as new inserts.

Therefore, it is an aspect of the present invention to provide a grinding fixture that is adapted for use with a plurality of standard insert shapes.

It is a further aspect of the present invention to provide a grinding fixture that allows the radius size and depth of material removed to be separately adjustable.

It is a further aspect of the invention to provide a grinding fixture that can be mounted on a standard surface grinder.

It is a further aspect of the invention to provide a grinding fixture that utilizes many standard components arranged into easily replaceable modular assemblies and is relatively inexpensive to build and maintain.

It is a further aspect of the invention to provide a grinding fixture that is simple to set up and to operate.

It is a further aspect of the invention to provide a grinding fixture that is easy to position to the rake angle of the tool insert.

It is a further aspect of the invention to provide a method for sharpening tool inserts that results in sharpened tool inserts that cut material more effectively than new tool inserts.

It is a still further aspect of the invention to provide a method for sharpening tool inserts that can be performed without the use of expensive dedicated equipment.

These aspects of the invention are not meant to be exclusive and other features, aspects, and advantages of the present invention will become readily apparent to those of ordinary skill in the art when read in conjunction with the following description, appended claims and accompanying drawings.

DETAILLED DESCRIPTION OF THE INVENTION

Figure 1:
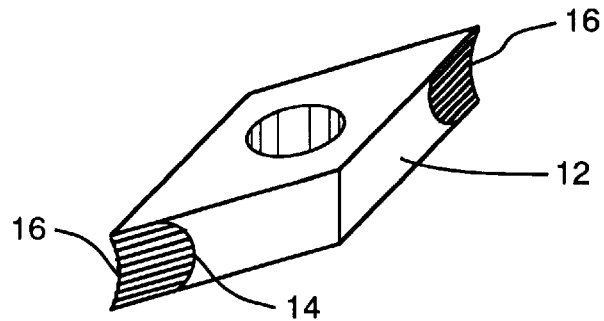
FIG. 1 is an isometric view of a typical diamond shaped insert that has been remanufactured using a radius and flank shape in accordance with the present invention.

FIG. 1 is a perspective view of a radius and flank shape 16 ground on the side rake 14 of a typical diamond shaped insert 12 using the grinding fixture of the present invention.

Figure 2:
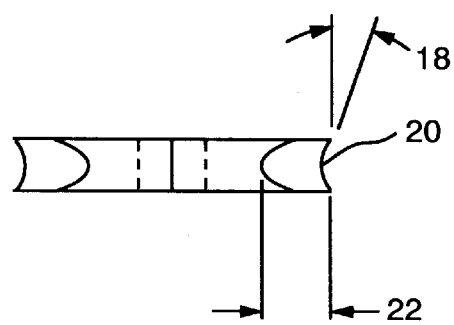
FIG. 2 is a side view of the insert of FIG. 1 showing a radius and flank shape with a concave form.

FIG. 2 is a side view of a typical diamond shaped insert 12 showing a radius and flank shape with a concave form 20 ground using the grinding fixture of the present invention. Grinding an insert such as diamond shaped insert 12 to a concave form 20 increases side rake angle 18 up to 5° through length 22, though the precise selection of the preferred angle is dependent upon the particular need of the user. Generally, rake angles are ground on the top or face of the insert and may be either neutral, positive or negative. Positive rake angles reduce the cutting force and direct the chip flow away from the material, while negative rake angles increase the cutting force required while providing greater strength at the cutting edge.

Figure 3:
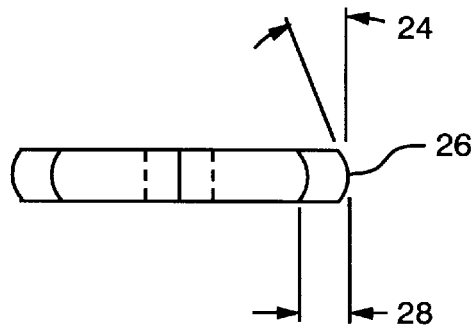
FIG. 3 is a side view of the insert of FIG. 1 showing a radius and flank shape with a convex form.

FIG. 3 is a side view of insert 12 showing a radius and flank shape with a convex form 26 ground using the grinding fixture of the present invention. Grinding an insert such as diamond shaped insert 12 to a convex form 26 decreases side rake angle 24 up to 5° through length 28.

It should be noted that, though FIGS. 1–3 describe only diamond shaped cutting tool inserts, the apparatus and process of the present invention are readily adapted to the remanufacture of any of the cutting tool inserts described in applicant's co-pending U.S. patent application No. 08/720, 459, filed on Sep. 30, 1996, which is hereby incorporated by reference.

Figure 4:
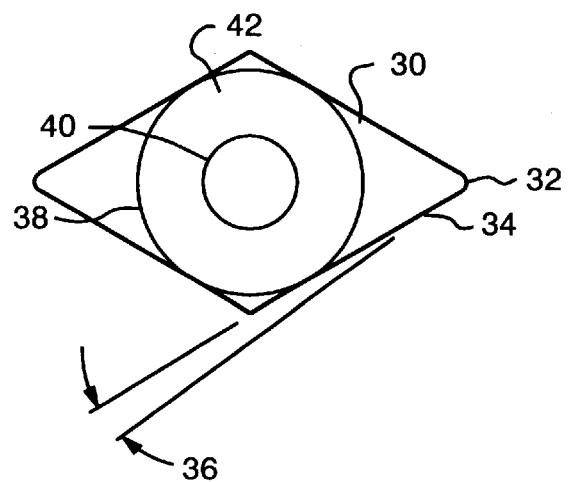
FIG. 4 is a top plan view of the insert of FIG. 1

FIG. 4 is a top plan view of the insert 12 showing the length of the sharpened edge 32 from 30 to 34 ground with the grinding fixture of the present invention. The ground shape has a run-out angle 36 of 1° to 3° from the insert flank. An average of 0.020 inches depth of material is removed in the ground area. The inscribed circle 38 is tangent to the flank locating areas that position the insert 12 in the holder. Radius and flank grinding must not reduce the diameter of the inscribed circle 38 or the insert 12 will not fit properly within the insert holder (not shown). The insert is locked in a holder through lock screw hole 40 or with a clamp that locks on the top surface 42.

Figure 5:
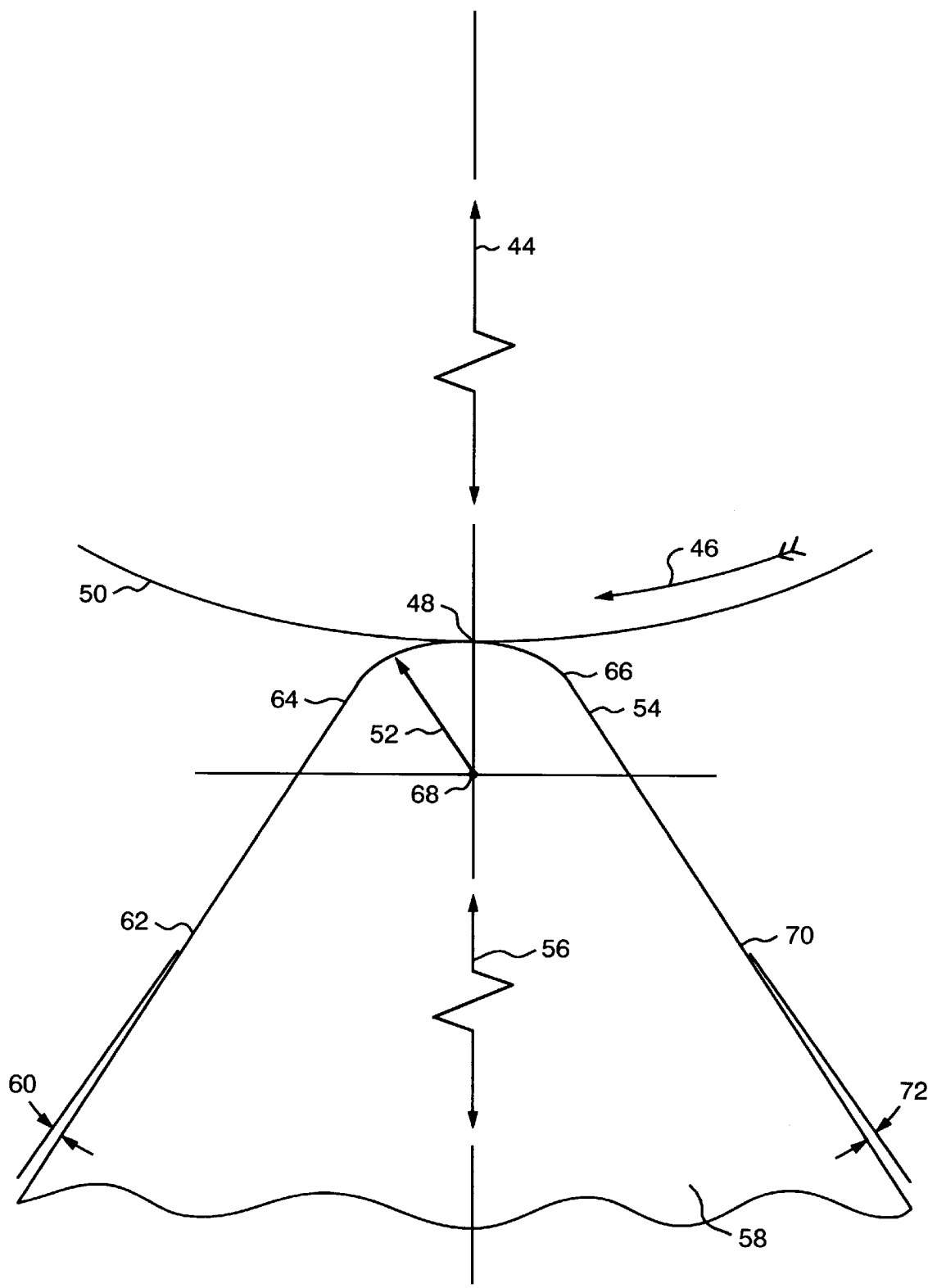
FIG. 5 is an enlarged view of the insert and grinding wheel showing the major elements of the radius and flank grind as produced by the grinding fixture of the present invention.

FIG. 5 is an enlarged view of the grinding wheel 50 and a diamond shaped insert 58 shown as positioned in the grinding fixture. The grinding wheel rotation 46 engages the insert at a point of contact 48. Insert 58 is swung about the fixture center of rotation 68 through arc 66 from 54 to 64 at radius 52. Radius 52 is adjusted by elevating or lowering grinding wheel 50 on axis 44. Grinding wheel 50 is adjusted to a predetermined position relative to the fixture center of rotation 68, corresponding to a predetermined radius 52, and insert 58 is elevated or lowered on axis 56 causing more or less material to be ground from point of contact 48. Flank angle 60, 1° to 3° from 64 to 62 run-out length, is ground when insert 58 is rotated to align point 64 and point of contact 48 providing a ground flank run-out angle tangent to the radius as also shown in FIG. 4 angle 36. Flank angle 72, 1° to 3°, from run-out length 54 to 70 is ground when insert 58 is rotated to align point 54 and point of contact 48 providing a ground flank run-out angle tangent to the radius (as also shown as angle 36 in FIG. 4).

Figure 6:
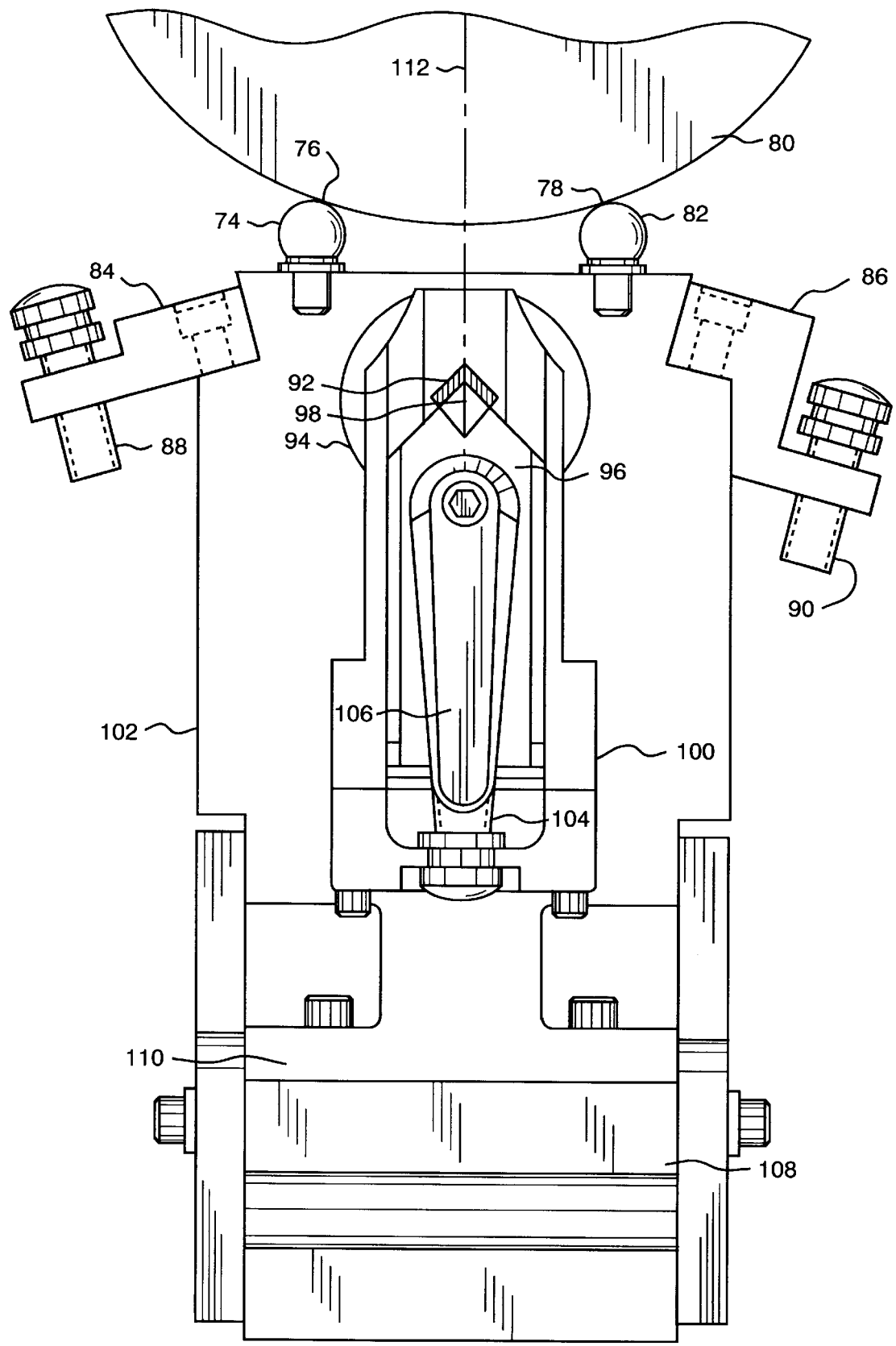
FIG. 6 is a front view of the grinding fixture of one embodiment of the present invention demonstrating grinding wheel alignment, swing rotation, stops and depth adjustment.

FIG. 6 is a front view of the grinding fixture and grinding machine. The bottom of grinding wheel 80 is positioned in contact with gage ball 74 at point 76 and gage ball 82 at point 78 simultaneously. This aligns the centerline 112 of grinding wheel 80 with the center of rotation 98 of the precision spindle 94. An insert 92 is placed in the insert holder 96 and clamped with locking handle 106. Grinding wheel 80 is repositioned to contact the insert 92 at a distance from the center of rotation 98 that allows the required radius to be ground. Slide 100 is swung clockwise about the center of rotation 98 to contact micrometer stop screw 88 and is swung counterclockwise to contact micrometer stop screw 90. In the preferred embodiment, rotation is supported by precision spindle 94 manufactured to a tolerance of 0.0001 tir. However, any mechanism that may be rotated with sufficient rigidity may be used to achieve similar results. Two different sets of stops 84 and 86 are required to allow the grinding fixture to grind all standard insert shapes. Stop 84 is adjustable for insert shapes having an included angle of 30° to 55°. Stops 84 and 86 are interchangeable on fixture body 110. The depth of material removed by grinding wheel 80 from insert 92 is controlled by adjusting holder 96 in slide 100 using dial screw 104. Solid steel fixture body 110 is bolted to a steel sine plate 108 that provides the rigidity required for the grinding process. Insert holder 96 is replaceable with other holders having forms that fit any standard insert shape or size.

Figure 7:
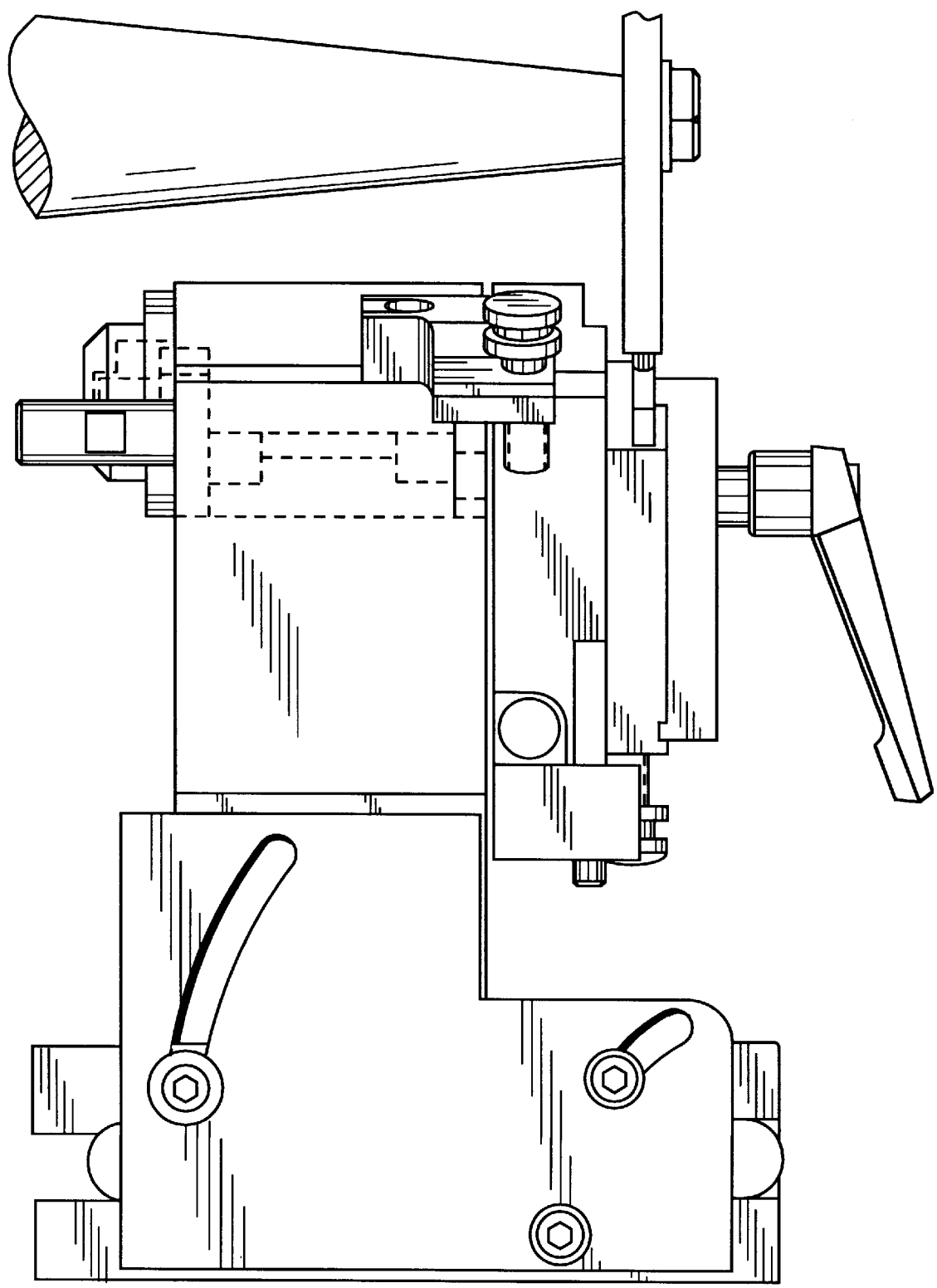
FIG. 7 is a left side view of the grinding fixture of one embodiment of the present invention showing wheel form, point of contact, radius adjustment, slide assembly, holder assembly and sine base.

FIG. 7 is a left side view of the grinding fixture 128 and grinding wheel 118 of the present invention showing the position of grinder spindle 116, grinding wheel 118, and point of contact at the rim 120 of grinding wheel 118 on insert 126. The rim 120 of grinding wheel 118 has a convex shape 122 that grinds a concave form on insert 126. The distance between point of contact at the rim 120 and center of rotation 124 establishes the radius ground into insert 126. Insert 126 is clamped in holder assembly 130 mounted in slide assembly 132. Sine base assembly 136 allows the fixture assembly 128 to be inclined clockwise from 0° to 30°. Sine base assembly 136 is locked in position by tightening screw 138 through side rail 134. Adjusting sine base assembly 136 allows swing fixture 128 to grind a radius and flank shape with a positive rake angle on insert 126.

Although the present invention has been described in considerable detail with reference to certain preferred versions thereof, other versions will be readily apparent to those of ordinary skill in the art. Therefore, the spirit and scope of the appended claims should not be limited to the description of the preferred versions contained herein.

What is claimed is:

1. A method of setting and operating a grinding fixture and a surface grinder to remanufacture cutting tool inserts comprising the steps of:

mounting a grinding fixture securely to a table of a surface grinder;

inserting a dulled cutting tool insert into an insert holder;

securing the dulled cutting tool insert in said insert holder;

aligning a centerline of a grinding wheel with an axis of rotation of said grinding fixture and setting a stop on said table of said surface grinder;

moving a grinding surface of said grinding wheel to a predetermined position relative to said axis of rotation of said grinding fixture corresponding to a desired radius of rotation;

adjusting a position of the cutting tool insert such that a desired amount of material is ground from an edge of the cutting tool insert;

adjusting a stop on said fixture to set a flank run-out angle; and rotating a slide attached to said insert holder such that the cutting tool insert travels a predetermined arc about said axis of rotation;

whereby the edge of the cutting tool insert contacts said grinding surface of said grinding wheel and is sharpened to a radius substantially equal to said radius of rotation.

2. The method of claim 1 wherein the step of aligning a centerline of a grinding wheel is accomplished by aligning said grinding wheel with a pair of gage balls attached to a fixture body at predetermined points of substantially equal distance from said axis of rotation.

3. The method of claim 1 further comprising the step of disposing the tool insert at an angle relative to said grinding surface of said grinding wheel such that a radius and a flank shape with a positive rake angle may be ground into the cutting tool insert.

4. The method of claim 1 further comprising the steps of:
moving said table of said surface grinder away from said grinding wheel and against a second table stop, said second table stop being located a distance from said first table stop that is greater than a radius of said grinding wheel;
removing a cutting tool insert having at least one sharpened edge from said insert holder;
inserting and securing a cutting tool insert having at least one dulled edge into said insert holder such that a dulled edge is exposed;
moving said table of said surface grinder to a position under said grinding wheel and against said stop of said table; and
rotating a slide attached to said insert holder such that said the cutting tool insert travels a predetermined arc about said axis of rotation.

5. A grinding fixture for sharpening a cutting tool insert comprising:
an insert holder adapted to securely grasp the cutting tool insert;
a slide into which said insert holder is secured, said slide being adapted to align the cutting tool insert relative to a center of rotation of a radius of the tool insert;
a spindle attached to said slide such that said insert holder may be rotated about an axis of rotation, wherein said axis of rotation corresponds to the center of rotation of the radius of the tool insert;
a rigid fixture body into which said spindle is mounted, said rigid fixture body comprising a pair of stops adapted to contact said slide when said slide is rotated predetermined distances about said axis of rotation; and
a mounting mechanism adapted to secure said grinding fixture in a substantially stationary position during sharpening.

6. The grinding fixture of claim 5 further comprising a pair of gage balls attached to said rigid fixture body at predetermined positions to permit a centerline of a grinding wheel to be aligned with said axis of rotation.

7. The grinding fixture of claim 5 wherein said slide is adjusted by a dial screw to control the depth of material ground from the cutting tool insert.

8. The grinding fixture of claim 5 wherein said insert holder further comprises a locking handle adapted to quickly secure the cutting tool insert in said insert holder.

9. The grinding fixture of claim 5 wherein said mounting mechanism comprises a pair of clamps which bolt said rigid fixture body securely to a sine plate.

10. The grinding fixture of claim 9 wherein said sine plate is adapted to incline said rigid fixture body clockwise in a plane perpendicular to said axis of rotation such that a radius and a flank shape with a positive rake angle may be ground into the cutting tool insert.

11. The grinding fixture of claim 5 wherein said spindle is a precision spindle.

12. An assembly for remanufacturing a cutting tool insert comprising:
a grinding machine having a grinding wheel; and
a grinding fixture comprising;
an insert holder adapted to securely grasp the cutting tool insert;
a slide into which said insert holder is secured, said slide being adapted to permit adjustment of the cutting tool insert relative to a center of rotation of said grinding fixture;
a spindle attached to said slide such that the cutting tool insert may be rotated about an axis of rotation, wherein said axis of rotation corresponds to the center of rotation of the cutting tool insert;
a rigid fixture body into which said spindle is mounted, said rigid fixture body comprising a pair of stops adapted to contact said slide when said slide is rotated predetermined distances about said axis of rotation; and
a mounting mechanism adapted to secure said grinding fixture to said grinding machine in a substantially stationary position during sharpening;
whereby, the cutting tool insert is secured by said insert holder in said grinding fixture, a centerline of said grinding wheel is adjusted to be aligned with said axis of rotation, said grinding wheel is lowered to a predetermined position relative to said axis of rotation corresponding to a predetermined radius of rotation, the cutting tool insert is adjusted to a predetermined position such that a desired amount of material is ground from an edge of the cutting tool insert, and said slide is rotated a predetermined distance about said axis of rotation such that the edge of the cutting tool insert contacts a surface of said grinding wheel and is sharpened to a radius substantially equal to the radius of rotation.

13. The assembly of claim 12 wherein said grinding fixture further comprises a pair of gage balls attached to said rigid fixture body at predetermined positions to permit said centerline of said grinding wheel to be aligned with said axis of rotation.

14. The assembly of claim 13 wherein said slide is adjusted by a dial screw to control the amount of material ground from the cutting tool insert.

15. The assembly of claim 14 wherein said spindle is a precision spindle.

16. The assembly of claim 15 wherein said mounting mechanism comprises a pair of clamps which bolt said rigid fixture body securely to a sine plate.

17. The assembly of claim 16 wherein said sine plate is adapted to incline said rigid fixture body clockwise in a plane perpendicular to said axis of rotation such that a radius and a flank shape with a positive rake angle may be ground into the cutting tool insert.

18. The assembly of claim 15 wherein said insert holder further comprises a locking handle adapted to quickly secure the cutting tool insert in said insert holder.

* * * * *